United States Patent
Zhao (10) Patent No.: US 10,895,658 B2
(45) Date of Patent: Jan. 19, 2021

(54) METHOD FOR OPERATING A METAL DETECTOR AND METAL DETECTOR

(71) Applicant: Mettler-Toledo Safeline Ltd., Manchester (GB)

(72) Inventor: Yifei Zhao, Manchester (GB)

(73) Assignee: METTLER-TOLEDO SAFELINE LTD., Manchester (GB)

( * ) Notice: Subject to any disclaimer, the term of this patent is extended or adjusted under 35 U.S.C. 154(b) by 0 days.

(21) Appl. No.: 16/850,166

(22) Filed: Apr. 16, 2020

(65) Prior Publication Data
US 2020/0333498 A1    Oct. 22, 2020

(30) Foreign Application Priority Data

Apr. 17, 2019    (EP) .................................... 19169834

(51) Int. Cl.
*G01V 3/10*    (2006.01)

(52) U.S. Cl.
CPC .................................... *G01V 3/107* (2013.01)

(58) Field of Classification Search
CPC ............. G01V 3/107; G01V 3/00; G01V 3/08
USPC .......................... 340/552, 551; 324/258, 326
See application file for complete search history.

(56) References Cited

U.S. PATENT DOCUMENTS

| | | |
|---|---|---|
| 2,995,699 A | 8/1961 | Charles et al. |
| 4,070,612 A | 1/1978 | Mcneill et al. |
| 5,691,640 A | 11/1997 | King |
| 5,892,692 A | 4/1999 | Whikehart et al. |
| 7,545,140 B2 * | 6/2009 | Humphreys ........... G01V 3/107 324/243 |
| 8,587,301 B2 | 11/2013 | Derungs |
| 2003/0164766 A1 * | 9/2003 | Britton .................... G01V 3/105 340/552 |
| 2003/0184285 A1 * | 10/2003 | Anderson ................ A61B 5/06 324/207.17 |
| 2005/0253711 A1 | 11/2005 | Nelson |

(Continued)

FOREIGN PATENT DOCUMENTS

| | | |
|---|---|---|
| EP | 2812734 B1 | 4/2018 |
| GB | 2361544 A | 10/2001 |
| WO | 2009144461 A2 | 12/2009 |

OTHER PUBLICATIONS

Nutaq, "Digital I/Q demodulator with a high-speed ADC", https://www.nutaq.com/blog/digital-iq-demodulator-high-speed-adc, retrieved on Mar. 16, 2020, 5 pages.

(Continued)

*Primary Examiner* — Emily C Terrell
(74) *Attorney, Agent, or Firm* — Buchanan Ingersoll & Rooney PC (57) ABSTRACT

The method and system are disclosed for operating a metal detector having a balanced coil system with a drive coil that is connected to a transmitter unit which provides a transmitter signal with at least one operating frequency ($f_{TX}$), and with first and second detection coils that provide an output signal to a receiver unit that processes a related receiver signal which includes an imbalance signal, and that provides digital in-phase and quadrature components ($d_I$, $d_Q$) of the demodulated imbalance signal.

20 Claims, 5 Drawing Sheets

(56) References Cited

U.S. PATENT DOCUMENTS

| | | |
|---|---|---|
| 2007/0067123 A1 | 3/2007 | Jungerman |
| 2009/0045813 A1* | 2/2009 | Emery ................... G01V 3/107 |
| | | 324/329 |
| 2009/0318098 A1 | 12/2009 | Stamatescu et al. |
| 2012/0086455 A1* | 4/2012 | McAdam ............... G01V 3/107 |
| | | 324/326 |
| 2012/0206138 A1 | 8/2012 | Derungs |
| 2013/0338953 A1 | 12/2013 | Derungs |
| 2015/0234075 A1 | 8/2015 | Moore et al. |
| 2017/0097438 A1 | 4/2017 | Reime |
| 2017/0338695 A1 | 11/2017 | Port |
| 2017/0358954 A1 | 12/2017 | Ren |

OTHER PUBLICATIONS

Search Report dated Nov. 7, 2019, by the European Patent Office for Application No. 19169830.7.
Search Report dated Oct. 17, 2019, by the European Patent Office for Application No. 19169829.9.
Search Report dated Oct. 25, 2019, by the European Patent Office for Application No. 19169834.9.
Wikipedia, "atan2", https://en.wikipedia.org/wiki/Atan2, retrieved on Mar. 19, 2020, 5 pages.
Wikipedia, "Direct digital synthesis", https://en.wikipedia.org/wiki/Direct_digital_synthesis, retrieved on Mar. 16, 2020, 3 pages.
Wikipedia, "Rotation matrix", https://en.wikipedia.org/wiki/Rotation_matrix, retrieved on Mar. 19, 2020, 16 pages.
Wikipedia, CORDIC, https://en.wikipedia.org/wiki/CORDIC, retrieved on Mar. 16, 2020, 8 pages.

* cited by examiner

METHOD FOR OPERATING A METAL DETECTOR AND METAL DETECTOR

RELATED APPLICATION

This application claims priority under 35 U.S.C. § 119 to European Patent Application No. 19169834.9 filed in Europe on Apr. 17, 2019, the entire content of which is hereby incorporated by reference in its entirety.

FIELD

The present disclosure relates to a method for operating a metal detector that uses one or more operating frequencies and to a metal detector operating according to this method.

BACKGROUND INFORMATION

An industrial metal detector as described for example in U.S. Pat. No. 8,587,301 B2, the disclosure of which is incorporated herein by reference in its entirety, is used for detecting metal contaminants in a product. When properly installed and operated, it will help reducing metal contamination and improving food safety. Most modern metal detectors utilise a search head having a "balanced coil system". Detectors of this design are capable of detecting all metal contaminant types including ferrous, nonferrous and stainless steels in a large variety of products such as fresh and frozen products.

A metal detector that operates according to the "balanced coil"—principle can include three coils, a drive coil and two identical detection coils that are wound onto a non-metallic frame, each exactly parallel with the other. Since the detection coils, which can enclose the drive coil centred in between, are identical, theoretically identical voltages are induced in the detection coils. In order to receive an output signal that is zero when the system is in balance, the first detection coil is connected in series with a second detection coil having an inverse sense of winding. Hence, under ideal conditions, the voltages induced in the detection coils, that are of identical amplitude and inverse polarity cancel out one another in the event that the system is in balance and no contaminant is present in an observed product.

However, as soon as a particle of metal passes through the coil arrangement, the electromagnetic field is disturbed first near one detection coil and then near the other detection coil. While the particle of metal is conveyed through the detection coils, the voltage induced in each detection coil is changed (e.g., by nano-volts). This change in balance results in a signal at the output of the detection coils that, in a receiver unit, is processed, amplified and subsequently used to detect the presence of the metal contaminant in the observed product.

In the receiver unit the input signal is normally split into an in-phase component and a quadrature component. The vector composed of these components has a magnitude and a phase angle, which is typical for the products and the contaminants that are conveyed through the coil system. In order to identify a metal contaminant, "product effects" should be removed or reduced. If the phase of the product is known then the corresponding signal vector can be reduced so that a higher sensitivity results for the detection of signals originating from metal contaminants.

Methods applied for eliminating unwanted signals from the signal spectrum exploit the fact that metal contaminants, products and other disturbances have different influences on the magnetic field so that the detected signals differ in phase. Materials with a high conductivity cause signals with a higher resistive signal component and a smaller reactive signal component. Materials with a high magnetic permeability cause signals with a smaller resistive signal component and a higher reactive signal component. Signals caused by ferrite are primarily reactive, while signals caused by stainless steel are primarily resistive. Products, which are conductive, can cause signals with a strong resistive component. The phase angle of the signal vectors between the resistive signal component and reactive signal component remains normally constant, when a product or contaminant is conveyed through the metal detector.

As already described, under ideal conditions the balanced coil system does not provide an output signal if no product or contaminant is present. However, as described in EP 2812734 B1, the disclosure of which is incorporated herein by reference in its entirety, despite the fact that identical detection coils are set in a near perfectly balanced state at the factory site, there will still be occasions where the detection coil system will fail to be in a balanced state with no test items or contaminants present, resulting for example in perfectly acceptable food products being rejected. The balance of the detector can be disturbed due to mechanical impacts on the system, due to changing ambient conditions, due to metallic objects located in the vicinity of the detector or due to relaxation or aging of components. In view of the high sensitivity of metal detection systems and minute effects of contaminants on the output voltage of the coil system, imbalances may cause saturation of the receiver channels, particularly of the input amplifiers and the phase sensitive detectors, which only operate over a limited voltage signal range. In order to remove such imbalances an adjustable balance signal derived from the drive signal is combined with the output signal of the detector and varied until the combined output signal is compensated.

The output signal and the adjustable balance signal are individually filtered to remove one or more harmonics prior to being combined. Further, the adjustable balance signal may be adjusted for example by means of adjustable potentiometers. This compensation circuit, which should operate with highest accuracy, involves using expensive low noise components. Still, the compensation circuit will not only counteract imbalances but will also introduce noise into the detection system, e.g. by the potentiometers. Further, the compensation circuitry applied so far is inflexible and limited to imbalances relating to the operating frequency of the drive signal. Other disturbances, which are not directly linked to the operating frequency, cannot be corrected. Still further, the adjustment process, particularly when using potentiometers, can involve considerable time and may not completely cancel out the imbalance signal.

In U.S. Pat. No. 5,691,640 A, the disclosure of which is incorporated herein by reference in its entirety, a compensation circuitry for a metal detector is disclosed, which also uses signals derived from the drive signal. These signals are applied to the phase sensitive detectors and to multipliers to which control signals are applied. The output signals of the multipliers are applied via feedback isolation transformers to the input of the receiver stage. Such a complex and expensive compensation circuitry encounters issues as described above. This circuitry also includes expensive low noise components and isolation transformers, which must be designed accurately so that no further imbalance and noise is introduced. Further, compensation circuitry is inflexible and limited to imbalances relating to the operating frequency of the drive signal. Other disturbances, which are not directly linked to the operating frequency, cannot be corrected. Further, this circuitry may change its properties according to the selected operating frequencies. Hence, complexity of the circuitry and an additional imbalances possibly introduced will increase with a high number of operating frequencies, particularly if they are simultaneously applied.

SUMMARY

A method is disclosed for operating a metal detector having a balanced coil system with a drive coil that is connected to a transmitter unit which provides a transmitter signal (s1) with at least one operating frequency (fTX), and with a first detection coil and a second detection coil that provide an output signal (s2) to a receiver unit that processes a related receiver signal (s3) which includes an imbalance signal, and that provides digital in-phase and quadrature components (dI, dQ) of a demodulated imbalance signal, the method comprising: processing the digital in-phase and quadrature components (dI, dQ) of the imbalance signal in a signal controller for providing control data to a compensation unit that is configured for compensating the imbalance signal, applying the digital in-phase components (dI) of the imbalance signal to a first control unit (41I) which provides an in-phase control component (dCI) for the imbalance signal, and applying the digital quadrature components (dQ) of the imbalance signal to a second control unit (41Q) which provides a quadrature control component (dCQ) for the imbalance signal; synthesizing, in the compensation unit, a digital compensation signal (dCOMP) with a frequency of the imbalance signal, which corresponds to the at least one operating frequency (fTX), with a phase and magnitude according to the in-phase and quadrature control components (dCI, dCQ) provided for the imbalance signal; converting the digital compensation signal (dCOMP) into an analogue compensation signal (aCOMP); and applying the analogue compensation signal (aCOMP) to the balanced coil system or to the receiver signal (s2, s3) for compensating the imbalance signal.

A metal detector is also disclosed, comprising: a balanced coil system with a drive coil that is connected to a transmitter unit which is configured to provide a transmitter signal (s1) with at least one operating frequency (fTX); a first detection coil and a second detection coil configured to provide an output signal (s2); a receiver unit configured to receive the output signal and to process a receiver signal (s3) which includes an imbalance signal, and to provide digital in-phase and quadrature components (dI, dQ) of the demodulated imbalance signal; and a signal controller configured to receive the demodulated imbalance signal to provide control data to a compensation unit configured for compensating the imbalance signal, wherein a first control unit is configured to receive the digital in-phase components (dI) of the imbalance signal and to provide an in-phase control component (dCI) for the imbalance signal, and second control unit is configured to receive the digital quadrature components (dQ) of the imbalance signal and to provide a quadrature control component (dCQ) for the imbalance signal; the compensation unit being configured: to synthesize a digital compensation signal (dCOMP) with a frequency of the imbalance signal which corresponds to the at least one operating frequency (fTX), with a phase and magnitude according to the in-phase and quadrature control components (dCI, dCQ) provided for the imbalance signal; to convert the digital compensation signal (dCOMP) into an analogue compensation signal (aCOMP); and to apply the analogue compensation signal (aCOMP) to a compensation coil of the balanced coil system, or to the input signal (s2) of the receiver unit, or via a summation module or subtraction module to the receiver signal (s3) in a signal path of the receiver unit for compensating the imbalance signal.

BRIEF DESCRIPTION OF THE DRAWINGS

Detailed aspects and examples of the invention are described below with reference to the drawings, wherein.

DETAILED DESCRIPTION

The present disclosure is directed to providing an improved method for operating a metal detector and to an improved metal detector operating according to this method.

Exemplary embodiments allow accurately eliminating imbalances with little effort that appear in any stage of the metal detector, particularly in the coil system and in the receiver channels, and that are caused by influences external or internal to these stages.

An exemplary compensation unit can be flexible and easily adaptable to correct not only imbalances but also disturbances that adversely affect the performance of the metal detector. For example, it can be possible to eliminate various disturbances which appear independently of the operating frequency.

An exemplary metal detector can avoid the requirement of costly components and a complex compensation circuitry.

Furthermore, an exemplary compensation unit can accurately remove imbalances but not introduce itself noise or disturbances into the system.

In a first broad aspect, a method is disclosed for operating a metal detector, which includes a balanced coil system with a drive coil that is connected to a transmitter unit which provides a transmitter signal with at least one operating frequency, and with a first detection coil and a second detection coil that provide an output signal to a receiver unit that processes a related receiver signal, which can include an imbalance signal and provide digital in-phase and quadrature components of a demodulated imbalance signal. The metal detector can be designed and configured for detecting contaminants, such as metal contaminants, in products that are examined by the metal detector and for this purpose are transferred through the balanced coil system of the metal detector.

According to exemplary embodiments, the method can include:
- processing the digital in-phase and digital quadrature components of an imbalance signal in a signal controller for providing control data to a compensation unit that is used for compensating the imbalance signal,
- applying the digital in-phase components of the imbalance signal to a first control unit which provides an in-phase control component for the imbalance signal, and applying the digital quadrature components of the imbalance signal to a second control unit which provides a quadrature control component for the imbalance signal;
- in the compensation unit, synthesizing a digital compensation signal with the frequency of the imbalance signal, which corresponds to the at least one operating frequency, with a phase and magnitude according to the in-phase and quadrature control components provided for the imbalance signal;
- converting the digital compensation signal into an analogue compensation signal, and
- applying the analogue compensation signal to the balanced coil system or to the receiver signal for compensating the imbalance signal.

According to an exemplary disclosed method, the in-phase components and the quadrature components of the imbalance signal are detected, and related in-phase and quadrature control components are determined or calculated in control units. Based on these in-phase and quadrature control components a compensation signal is synthesized with a frequency, phase and magnitude suitable for compensating the imbalance signal. Hence, at least one control loop is formed, with negative feedback of control signals to decrease the size and finally cancel out any imbalance signal. Ideally a compensation signal can be synthesized identical to the imbalance signal and applied 180° out of phase with reference to the imbalance signal into the signal path. In reality, for example, a PID controller can be used to fully compensate the imbalance signal with control terms that have proportional, integral and derivative influence on the provided digital in-phase control components and the digital quadrature control components supplied to the compensation unit.

Hence, according to exemplary embodiments, digital in-phase and digital quadrature components of the imbalance signal can be processed to deliver digital in-phase control components and the digital quadrature control components. The imbalance signal and its components can be gained in different ways. The imbalance signal can be observed when the metal detector is operative for example, without any products being transferred through the balanced coil system. The transfer of products may be delayed until the synthesized compensation signal is suitably enhanced and/or optimized. However, if the product signals are known or are lying in a different frequency range, then the products can be measured and the product signals may be subtracted or separated from the receiver signal in order to obtain the imbalance signal. Hence, in the first control mode or calibration mode the imbalance signal is measured and a corresponding compensation signal is synthesized, with which the imbalance signal is fully or at least partially eliminated.

After the initial calibration of the metal detector has been performed in the first control mode or calibration mode the metal detector can be switched to a normal operation mode, in which products are examined and the imbalance signal is eliminated by way of the synthesized compensation signal which has been stored. In this operation mode changes of the imbalance signal are neglected.

In an exemplary embodiment, the metal detector can be switched to a second control mode after the first control mode has been terminated. In the second control mode products are examined and the remaining imbalance signal is further observed and further eliminated. For this purpose the imbalance signal may be separated from the receiver signal for example by a filter stage, which allows the imbalance signal to pass through.

In an exemplary normal operation mode or in a second control mode the imbalance signal is for example monitored and the metal detector is returned to the first control mode if the imbalance signal exceeds a predetermined threshold. In the first control mode the transfer of products through the balanced coil system is for example interrupted until the synthesized compensation signal is optimized again. This optimization may for example be performed within a few seconds. Afterwards the metal detector is again switched to normal operation mode or to the second control mode.

The receiver signal may be demodulated in the analogue domain or in the digital domain to regain the baseband signals of the products, contaminants and the imbalance signal or any disturbances.

Demodulation of a signal in the digital domain is described for example in https://www.nutaq.com/blog/digital-iq-demodulator-high-speed-adc, the disclosure of which is incorporated herein by reference in its entirety. In a digital I/Q demodulator, a receiver signal centred at an operating frequency is sampled directly by a single high-speed ADC device. The sampled receiver signal is mixed in a digital in-phase mixer and in a digital quadrature mixer with digital cosine and sine samples of the operating frequency generated by a direct-digital synthesizer (DDS) to translate the receiver signal to in-phase and quadrature signals in the baseband. After filtering out the high-frequency component of the outputs of the in-phase mixer and the digital quadrature mixer, the baseband signal is obtained. The use of processing the receiver signal in a high-speed ADC and digital I/Q demodulator can reduce potential errors such as gain imbalances and DC offsets when the translation from the operating frequency to baseband is performed in analogue domain.

Translation of the receiver signal to baseband can also be performed in the analogue domain. In this embodiment the analogue receiver signal is compared in a first phase detector with an analogue in-phase reference signal, and in a second phase detector with an analogue quadrature reference signal in order to produce analogue in-phase components and analogue quadrature components of a baseband signal that are converted into digital in-phase and quadrature components.

Hence, in a first exemplary embodiment of the disclosed metal detector or exemplary method, the receiver signal is demodulated in the analogue domain. In a second exemplary embodiment of the disclosed metal detector or method, the receiver signal is demodulated in the digital domain.

The signal controller is for example operated in two or more modes, in which different sets of control terms are applied to the control units. After initialization of the metal detector a first control mode is for example set and maintained until a predetermined condition is met, e.g. for a defined period of time or as long as the imbalance signal exceeds a given threshold. As already discussed, during this first control mode or calibration mode, for example no products are examined. The first control mode is maintained for example for period of time, in which the imbalance signal is for example reduced to a level at which the imbalance signal has no significant influence on the measurement. Alternatively, the level at which the imbalance signal has no significant influence on the measurement is predetermined and compared with the actual imbalance signal. As soon as the predetermined condition is met, the first control mode is changed to a second control mode in which measurement of products is performed while the imbalance signal is still observed and reduced in a control loop. In the first control mode the imbalance signal is quickly reduced, while in the second control mode a remaining imbalance signal is slowly driven to a minimum value or cancelled out completely. The control terms for the second control mode are selected such that signal corrections in the control loop do not lead to disturbances during measurement of the products. For example, control terms for the control units are selected such that overshoots are avoided. In the second control mode operating conditions are therefore continuously optimized, while measurements can be performed.

An exemplary disclosed method allows with little effort accurately eliminating imbalances that occur in any stage of the metal detector, particularly in the coil system, in the receiver channel, and that are caused by influences external or internal to these stages. The exemplary compensation unit can flexibly and easily be adapted and configured to correct any imbalances and further disturbances that adversely affect the performance of the metal detector. In particular, disturbances can be eliminated which do not directly correspond to the operating frequency.

For any disturbance signal the signal controller can provide control signals and the compensation unit can generate or synthesize corresponding correction signals. The signal controller will provide information with regard to the frequency, magnitude and phase of the disturbance signal for which a correction signal will be synthesized in the compensation unit. The compensation unit can generate or synthesize correction signals in the baseband of the measured signals or offset in frequency thereto. In the event that for example frequency sidebands are detected, such frequency sidebands can be eliminated by correction signals which are synthesized accordingly.

In an exemplary embodiment for eliminating any disturbance signal:
  in the signal controller, a digital in-phase component and a digital quadrature component and the frequency of a disturbance signal are determined;
  a digital in-phase control component and a digital quadrature control component are determined or calculated;
  in the compensation unit a digital correction signal is synthesized in accordance with the digital in-phase control component and the digital quadrature control component of the disturbance signal; and
  the digital correction signal is added to the digital compensation signal.

An exemplary compensation unit can avoid the requirement of costly components and a complex compensation circuitry. The compensation unit can, for example, include a field programmable gate array unit (FPGA), which can easily be adapted to future requirements. In addition or alternatively, the compensation unit can include one or more frequency synthesizers, such as direct digital synthesizers as described in https://en.wikipedia.org/wiki/Direct_digital_synthesis, with which the required frequencies for one or more compensation signals can be generated. Alternatively, signal data of waveforms of the at least one operating frequency or in-phase frequency components and quadrature frequency components thereof are sequentially read out from a memory unit or a look-up table. Data of one or more periods of a frequency signal can be stored with a desired resolution in the memory unit or look-up table and can be sequentially read out with a system clock to generate the related frequency. With the system clock the address of the data, which is a read out from memory, can be increased step-by-step. Hence, with a constant system clock and numerous waveforms stored in memory any related frequency can be generated with the desired resolution. However it is possible to change the frequency by selecting a different system clock.

An advantage of an exemplary control loop as disclosed is that any imbalance signal and any disturbance signal can be eliminated while no disturbing signal or noise is introduced into the metal detection system.

The exemplary disclosed method can be used for any type of metal detector, for example for a metal detector that uses only one operating frequency or that uses multiple frequencies which are individually selectable or simultaneously applicable. For each imbalance signal which occurs for a related operating frequency, a compensation signal can be individually synthesized in a corresponding control channel.

For example, in the receiver unit or in the signal controller, the imbalance signal is separated by at least one low pass filter from other signal components. In exemplary embodiments, the digital in-phase component of the imbalance signal can be applied via a first low-pass filter to the first control unit and the digital quadrature component of the imbalance signal is applied via a second low-pass filter to the second control unit. Demodulating the imbalance signal can result in DC-components. However, signals originating from products or contaminants which are traveling through the metal detector cause a low frequency modulation of the operating frequency. When demodulating the receiver signal, for example with reference frequencies in phase detectors, this low frequency is regained. By the low-pass filter with a corresponding cut-off frequency (e.g. <0.5 Hz), the signals of the product and contaminants and the imbalance signal can therefore be separated from one another. The influence of signals of products and contaminants in the control channel can therefore be excluded. Separation of the signals or filtering can be performed by a digital signal processor.

Based on the digital in-phase control component and the digital quadrature control component, the digital compensation signal can be synthesized or generated in different ways. In an exemplary embodiment:
  the digital in-phase control component and the digital quadrature control component are converted into a phase control signal and into a magnitude control signal;
  the phase control signal and the magnitude control signal are forwarded to the compensation unit;
  a synthesizer is controlled to generate the operating frequency with a phase in accordance with the phase control signal that is applied to the synthesizer; and
  in a multiplier the magnitude of the generated operating frequency is adjusted in accordance with the provided magnitude control signal for providing the digital compensation signal.

Conversion of the digital in-phase control component and the digital quadrature control component into a phase control signal and into a magnitude control signal can be done by the known CORDIC algorithm (https://en.wikipedia.org/ wiki/CORDIC); e.g. in a microcontroller or digital signal processor or FPGA provided in the signal controller or compensation unit.

In an exemplary embodiment:

the digital in-phase control component and the digital quadrature control component are provided to the compensation unit;

a synthesizer is controlled to generate an in-phase frequency component and a quadrature frequency component corresponding to the operating frequency, i.e. the frequency of the imbalance signal;

in an in-phase multiplier the magnitude of the generated in-phase frequency component is adjusted in accordance with the digital in-phase control component for providing a digital in-phase compensation component of the digital compensation signal, and in a quadrature multiplier the magnitude of the quadrature frequency component is adjusted in accordance with the digital quadrature control component for providing a digital quadrature compensation component of the digital compensation signal; and the digital in-phase compensation component of the digital compensation signal and the digital quadrature compensation component of the digital compensation signal are combined for providing a digital compensation signal.

Digital compensation signals which have been synthesized for each operating frequency, i.e. for each imbalance signal, can be combined for providing a combined digital compensation signal, which is converted to the analogue compensation signal.

As described, the compensation signal can be fully synthesized in the compensation unit without using signals generated by the transmitter unit. However, both units, the transmitter unit and the compensation unit, for example use a common master clock so that they are synchronized. By establishing phase coherence, in the system disturbing phase errors, phase drifts and phase noise and the like are avoided.

The compensation signal generated in the compensation unit can be applied at every point in the metal detector where the imbalance signal occurs. The compensation signal can be induced into the coil system for example by means of a compensation coil that is inductively coupled with the detection coils. Alternatively, the imbalance signal can be applied to the input of the receiver unit, e.g. to a compensation coil provided on a balanced transformer, or to the signal path of the receiver unit, for example via a subtraction module.

Figure 1:
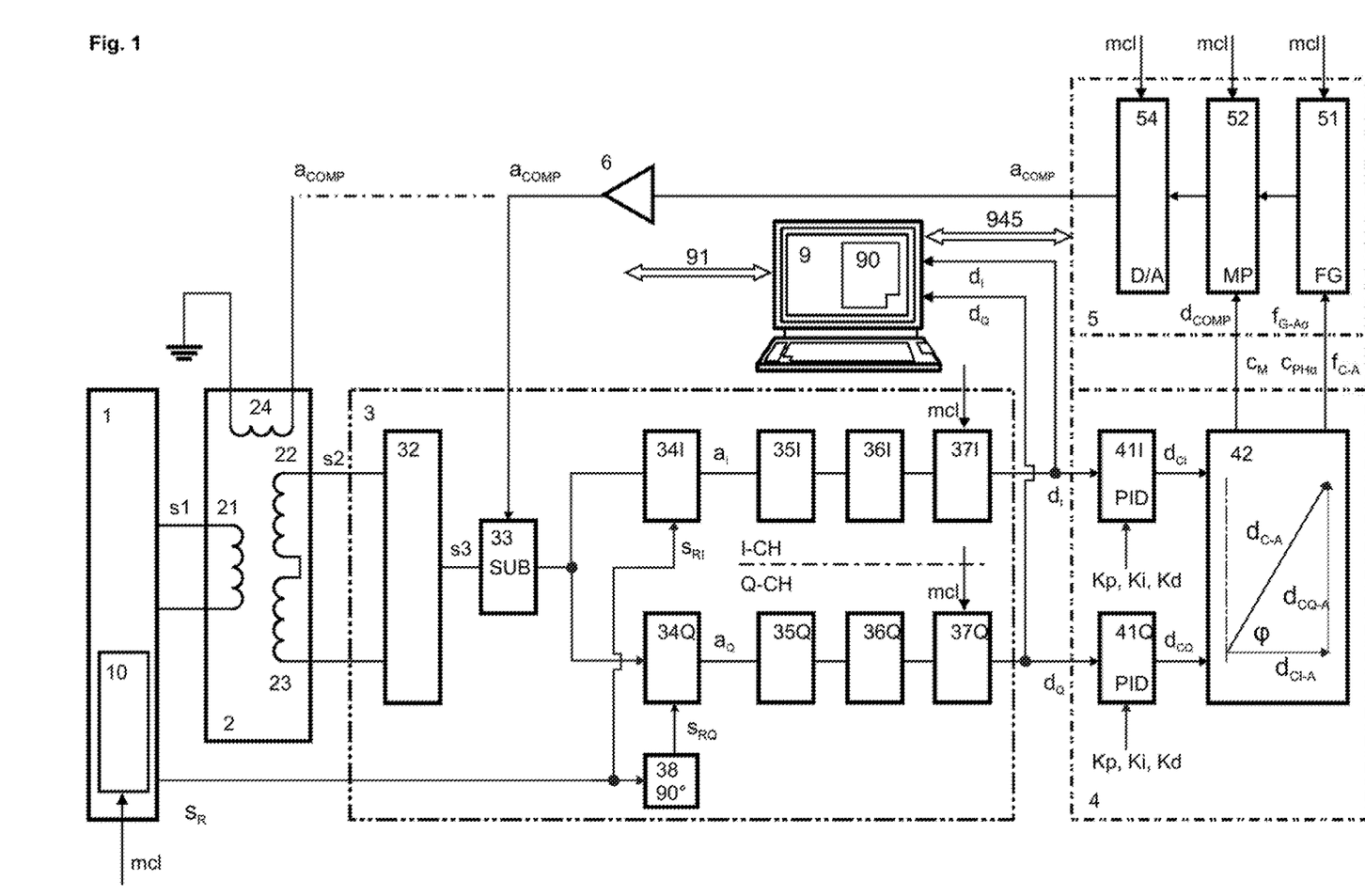
FIG. 1 shows an exemplary embodiment of a disclosed metal detector having a transmitter unit 1, a coil system 2 with a drive coil 21 and two detection coils 22, 23, a receiver unit 3, a control unit 9, and a signal controller 4 that provides data relating to an imbalance signal to a compensation unit 5, which synthesizes a compensation signal aCOMP that is introduced into the coil system 2 or into a signal path of the receiver unit 3.

FIG. 1 shows a block diagram of an exemplary metal detector as disclosed in accordance with the present disclosure, which includes a transmitter unit 1, a balanced coil system 2 with a drive coil 21 and a first and a second detection coil 22, 23, a receiver unit 3, a signal controller 4, a compensation unit 5 and a control unit 9, e.g. a personal computer that can for example include signal processing circuitry, such as at least one signal processor, designed and configured for processing signals $d_I$, $d_Q$ relating to products and contaminants provided by the receiver unit 3. The signal controller 4 and the compensation unit 5, which are used for compensating imbalances in the metal detector, can for example also be implemented in the control unit 9. The signal controller 4 is for example implemented in a digital signal processor and the compensation unit 5 is for example implemented in a field programmable gate array (FPGA), which receives data from the signal controller 4.

The transmitter unit 1 provides a transmitter signal s1 with at least one operating frequency $f_{TX}$ to the drive coil 21 of the balanced coil system 2 and a reference signal $s_R$ with the operating frequency $f_{TX}$ to the receiver unit 3. The transmitter signal s1 induces signals in the identical detection coils 22, 23 that are of the same amplitude but inverse polarity as long as the system is in balance, i.e. as long as no products or contaminants are conveyed through the metal detector.

The operating frequency $f_{TX}$ may be fixed or individually selectable from a plurality of frequencies $f_{TX-A}$, $f_{TX-B}$. Alternatively, a plurality of frequencies $f_{TX-A}$, $f_{TX-B}$ can simultaneously be generated in the transmitter unit 1, which is provided with at least one frequency synthesizer or frequency generator 10.

As soon as a product or contaminant passes through the balanced coil system 2, the signals induced in the detection coils 22, 23 will change. As a result the operating frequency $f_{TX}$ induced in the detection coils 22, 23 is modulated with a base band signal, whose amplitude and frequency are dependent on the electric and magnetic property, dimension and travelling speed of the object. Depending on the travelling speed the frequency of the baseband signal will change.

Imbalance signals cause a constant imbalance or constant signal offset which may disturb and saturate the receiver channels. Such imbalance signals may be caused by mechanical impacts on the system, by changing ambient conditions, by metallic objects located in the vicinity of the detected or due to relaxation or aging of components.

In an exemplary embodiment shown in FIG. 1 the output signals of the detection coils 22, 23 are applied to an input stage 32 of the receiver unit 3. The input stage 32 can include at least one amplifier and at least one filter unit. The input stage 32 delivers a receiver signal s3 via an optional subtraction unit 33 to an in-phase-channel I-CH and to a quadrature channel Q-CH. The in-phase-channel I-CH and quadrature channel Q-CH, which can be identically designed and configured, can each include a phase detector 34I; 34Q connected to a filter stage 35I; 35Q, followed by a gain stage 36I; 36Q and an analogue to digital converter 37I, 37Q.

The phase detectors 34I; 34Q, which receive at their inputs the receiver signal s3 and the in-phase reference signal $s_{RI}$ or the quadrature reference signal $s_{RQ}$ provided by the transmitter unit 1, act as demodulators and provide at their outputs the in-phase components $a_I$ or quadrature components $a_Q$ of the baseband signals, which originate from the conveyed products and contaminants or imbalances. The in-phase reference signal $s_R$ is routed from the transmitter unit 1 directly to the first phase detectors 34I and via a phase shifter 38 to the second phase detectors 34Q.

The analogue in-phase and quadrature signals $a_I$; $a_Q$ provided at the outputs of the phase detectors 34I; 34Q are forwarded via the filter units 35I; 35Q to the gain units 36I; 36Q, which for example allow setting the amplitudes of the processed signals to a desired value. Subsequently the filtered and calibrated signals are converted in an analogue to digital converter 37I; 37Q from analogue in-phase and quadrature signals to digital in-phase and quadrature signals $d_I$, $d_Q$. The digital in-phase and quadrature signals $d_I$, $d_Q$ provided at the output of the analogue to digital converter 37I; 37Q are forwarded to the control unit 9, where the digital in-phase and quadrature signals $d_I$, $d_Q$ are analysed and an alarm is raised if a signal is detected that relates to a contaminant.

The control unit 9 can for example, include a processing unit and an operating program 90 designed and configured for fulfilling the functions of a disclosed single frequency or multi-simultaneous frequency metal detector. The operating program 90 is enhanced for implementing exemplary embodiments of the presently disclosed method. The signal controller 4 and the compensation unit 5 are for example also implemented in the signal processing or signal generating circuitry contained in the control unit 9.

The digital in-phase and quadrature signals $d_I$, $d_Q$ provided at the output of the analogue to digital converter 37I; 37Q are forwarded further to the signal controller 4. In the signal controller 4 the digital in-phase signal $d_I$, which includes the in-phase component of the imbalance signal, is applied to a first control unit 41I, which provides an in-phase control component $d_{CI}$ for the imbalance signal. The quadrature signal $d_Q$, which includes the quadrature component of the imbalance signal, is applied to a second control unit 41Q, which provides a quadrature control component $d_{CQ}$ for the imbalance signal.

In the first control unit 41I and in the second control unit 41Q exemplary identical control terms Kp, Ki, Kd are applied, which have proportional and/or integral and/or derivative influence on the provided digital in-phase control components $d_{CI}$ and the digital quadrature control components $d_{CQ}$. Hence, for example a PID-controller is implemented, which is known in the art. A PID-controller continuously calculates an error value as the difference between a desired set-point and a measured process variable and applies a correction based on proportional, integral, and derivative terms (denoted P, I, and D respectively). These values can be interpreted in terms of time: P depends on the present error, I on the accumulation of past errors, and D is a prediction of future errors, based on the current rate of change. The weighted sum of these three actions is used to adjust the process via a control element. In the disclosed metal detector the measured process variables are the digital in-phase components $d_I$ and the digital quadrature components $d_Q$ of the imbalance signal. The set-point is zero targeting the complete elimination of the imbalance signal and the correction values are the calculated in-phase control component $d_{CI}$ and the quadrature control component $d_{CQ}$ and the analogue compensation signal $a_{COMP}$ derived therefrom. The control element can be regarded as the point of injection where the compensation signal $a_{COMP}$ is applied.

The in-phase control component $d_{CI}$ and the quadrature control component $d_{CQ}$ are forwarded to a converter 42, which for example uses a CORDIC-algorithm for converting the digital in-phase control component $d_{CI}$ and the digital quadrature control component $d_{CQ}$ into a phase control signal $c_{PH}$ and into a magnitude control signal $c_M$. FIG. 1 shows the control vector $d_C$ with the magnitude and the phase angle α, corresponding to the digital in-phase control component $d_{CI}$ and the digital quadrature control component $d_{CQ}$. The magnitude and the phase angle α of the control vector $d_C$ corresponding to the imbalance signal can be constant. Signals relating to products and contaminants would have a constant phase angle, but a magnitude, which changes with a frequency that corresponds to the velocity with which the products and contaminants are conveyed through the metal detector.

The phase control signal $c_{PH-A}$ and the magnitude control signal $c_{M-A}$, which are forwarded to the compensation unit 5, together with a frequency control signal $f_{C-A}$, can include essential information for synthesizing a digital compensation signal $d_{COMP}$, which corresponds to the control vector $d_C$. In the present example the compensation signal is generated or synthesized for a first operating frequency $f_{TX-A}$. A corresponding frequency control signal $f_{C-A}$ is applied together with the phase control signal $c_{PH-A}$ to a frequency generator 51 in the compensation unit 5. The frequency generator 51 therefore generates a frequency signal $f_{G-A\alpha}$ with a frequency corresponding to the frequency control signal $f_{C-A}$ and a phase angle corresponding to the phase control signal $c_{PH-A}$. The generated frequency signal $f_{G-A\alpha}$ is supplied to a multiplier 52 in which the magnitude of the generated frequency signal $f_G$ is adjusted in accordance with the provided magnitude control signal $c_M$ for providing the digital compensation signal $d_{COMP}$.

The generated or synthesized digital compensation signal $d_{COMP}$ is forwarded to a digital to analogue converter 54, which provides a corresponding analogue compensation signal $a_{COMP}$ that can be applied at various points within the metal detector. The analogue compensation signal $a_{COMP}$ is applied for example to the balanced coil system or to a receiver signal s2, s3 at the input of the receiver unit 3 or within the signal path of the receiver unit 3. In exemplary embodiments, the analogue compensation signal $a_{COMP}$ is amplified in an amplifier 6, such as a buffer amplifier, before it is applied.

In an exemplary embodiment, the analogue compensation signal $a_{COMP}$ is applied to a compensation coil 24, which is inductively coupled with at least one of the drive coils. In a second exemplary embodiment, the analogue compensation signal $a_{COMP}$ is applied to a subtraction unit 33 in which the imbalance signal present in the system is reduced by the analogue compensation signal $a_{COMP}$ to, for example, zero.

For any other disturbance signals occurring in the metal detector the digital in-phase components and a digital quadrature components and the frequency can be determined and digital in-phase control components and a digital quadrature control components can be calculated. In the compensation unit 5, digital correction signals $d_{CORR}$ in accordance with the digital in-phase component and the digital quadrature component and the frequency of the disturbance signal can be synthesized and added to the digital compensation signal $d_{COMP}$ (see FIG. 3 and FIG. 4).

Hence, with the exemplary method as disclosed, any detected disturbances can be eliminated by analysing the disturbance signals and synthesizing a corresponding correction signal. The operating conditions and operating parameters of the metal detector are selected by means of a computer configured with control program 90. The control unit 9 for example, communicates via a first control bus 91 with the transmitter unit 1 and via a second control bus 945 with the signal controller 4 and with the compensation unit 5. In exemplary embodiments all processes executed in the metal detector, the known measurement processes and all processes relating to the disclosed method are for example controlled by the control unit 9.

In the event that for example two operating frequencies $f_{TX-A}$, $f_{TX-B}$ are selected in the control unit 9, then the exemplary transmitter unit 1 is instructed to generate these two operating frequencies $f_{TX-A}$, $f_{TX-B}$. Further, two control channels 4A, 4B; 5A, 5B are opened for compensating imbalance signals related to these two operating frequencies $f_{TX-A}$, $f_{TX-B}$. The first control channel, which includes a first receiver module as shown in FIG. 1, a first signal controller 4A and a first compensation unit 5A, is part of a first control loop in which an imbalance signal for the first operating frequency $f_{TX-A}$ is addressed. The second control channel, which includes a second receiver module as shown in FIG. 1, a second signal controller 4B and a second compensation unit 5B, is part of a second control loop in which imbalance signal for the second operating frequency $f_{TX-B}$ is addressed. In the receiver modules, in phase and quadrature channels I-CH, Q-CH are provided as shown for example in FIG. 1.

In this way, every signal controller 4A, 4B is supplied with demodulated digital in-phase components $d_I$ and digital quadrature components $d_Q$ of the imbalance signal for the related operating frequency $f_{TX-A}$, $f_{TX-B}$.

In order to ensure phase coherence for all processes executed in the metal detector, the at least one generated frequency signal $f_{G-A}$, $f_{TXG-B}$ or in-phase frequency components $f_{GI}$ and a quadrature frequency components $f_{GQ}$ thereof generated in the compensation unit 5 (see FIG. 4) are synchronized with regard to phase and frequency with the corresponding operating frequencies $f_{TX-A}$, $f_{TX-B}$ generated in the transmitter unit 1. FIG. 1 shows that a master clock mcl is applied to a frequency generator 10 located in the transmitter unit 1, to the analogue-to-digital converters 37I and 37Q in the receiver unit 3 and to the frequency generator 51, the multiplier 52 and the digital-to-analogue converter 54 in the compensation unit 5.

Figure 2:
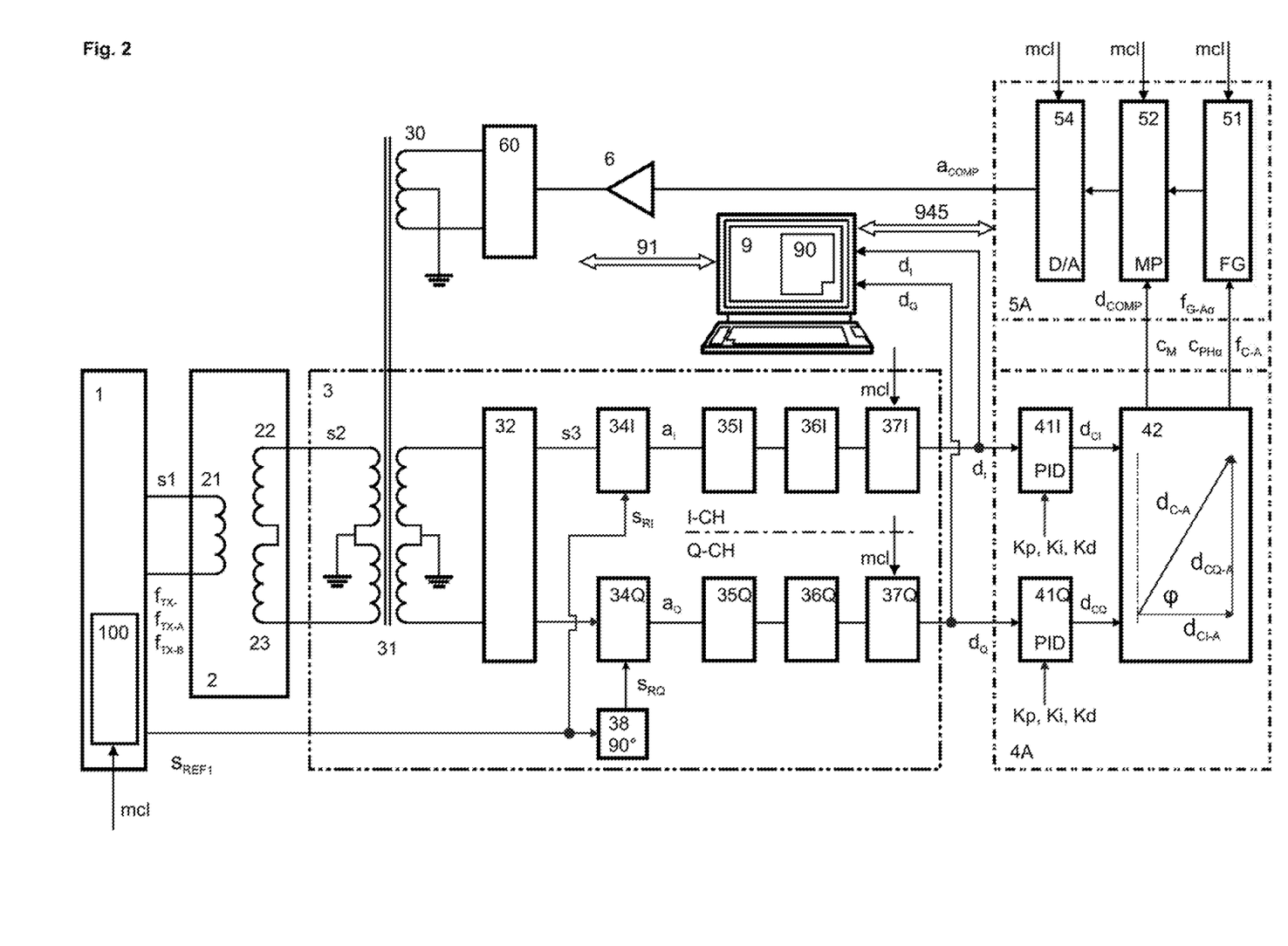
FIG. 2 shows an exemplary metal detector of FIG. 1 with the detection coils 22, 23 of the coil system 2 connected to a balanced transformer 31, which is located at the input of the receiver unit 3, and which includes a balanced compensation coil 30 to which the compensation signal aCOMP is applied.

FIG. 2 shows the metal detector of FIG. 1 with the detection coils 22, 23 of the coil system 2 connected to a balanced transformer 31, which is located at the input of the receiver unit 3. The output signals of the detection coils 22, 23 are applied to center-tapped primary windings of the balanced transformer 31 that mirror the detection coils 22, 23. Further, the balanced transformer 31 includes two identical center-tapped secondary windings whose opposite tails are connected to the input stage 32 of the receiver unit 3. The balanced transformer 31 further includes a balanced compensation coil 30 to which the compensation signal $a_{COMP}$ is applied via amplifier 6 and a single-ended-to-differential-converter 60 (below: SETD-converter). The SETD converter 60 provides a pair of differential signals at its output.

Figure 3:
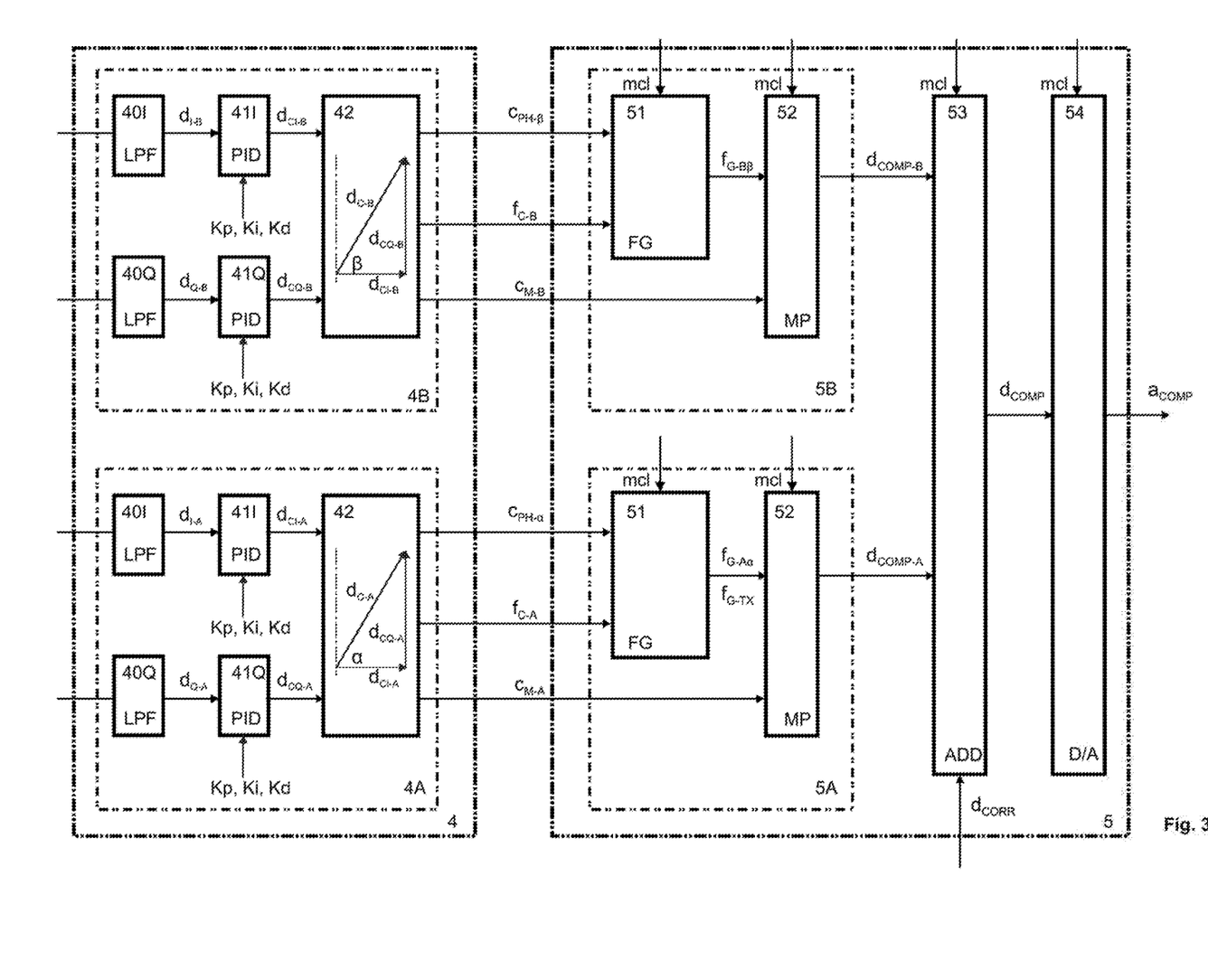
FIG. 3 shows an exemplary signal controller 4 and compensation unit 5 provided for two control channels in an exemplary embodiment.

FIG. 3 shows the signal controller 4 and the compensation unit 5 with two control channels dedicated to the selected operating frequencies $f_{TX-A}$, $f_{TX-B}$. Each control channel includes a signal controller 4A; 4B and a compensation unit 5A; 5B respectively. The signal controllers 4A; 4B include low pass filters 40I; 40Q for separating the imbalance signal from other signals relating for example to products or contaminants. Signals relating to products and contaminants are therefore barred and will not influence the processes in the control loops. The digital in-phase component $d_I$ of the imbalance signal is applied via a first low-pass filter 40I to the first control unit 41I and the digital quadrature component $d_{CQ}$ of the imbalance signal is applied via a second low-pass filter 40Q to the second control unit 41Q.

As described with reference to FIG. 1, digital in-phase and quadrature signals $d_{I-A}$, $d_{Q-A}$; $d_{I-B}$, $d_{Q-B}$ provided at the outputs of the related low pass filters 40I; 40Q are forwarded to the control units 41I, 41Q. In each control channel the digital in-phase signals $d_{I-A}$; $d_{I-B}$ are applied to a first control unit 41I, which provides an in-phase control component $d_{CI-A}$; $d_{CI-B}$ for the imbalance signal. The quadrature signal $d_{QA}$, $d_{QB}$ is applied to a second control unit 41Q, which provides a quadrature control component $d_{CQ-A}$; $d_{CQ-B}$ for the imbalance signal.

In each control channel, the in-phase control component $d_{CI-A}$; $d_{CI-B}$ and the quadrature control component $d_{CQ-A}$; $d_{CQ-B}$ are forwarded to a converter 42, which for example uses a CORDIC-algorithm for converting the digital in-phase control component $d_{CI-A}$; $d_{CI-B}$ and the digital quadrature control component $d_{CQ-A}$; $d_{CQ-B}$ into a phase control signal $c_{PH\alpha}$; $c_{PH\beta}$ and into a magnitude control signal $c_{M-A}$; $c_{M-B}$.

In each control channel, the phase control signal $c_{PF\alpha}$; $C_{PH\beta}$ and the magnitude control signal $c_{M-A}$; $c_{M-B}$, which are forwarded to the compensation unit 5, together with a frequency control signal $f_{C-A}$; $f_{C-B}$, include the essential information for synthesizing a digital compensation signal $d_{COMP-A}$, $d_{COMP-B}$. The corresponding frequency control signal $c_{C-A}$; $f_{C-B}$ is applied together with the phase control signal $C_{M-A}$; $C_{M-B}$ to a related frequency generator 51. The frequency generator 51 generates a corresponding frequency signal $f_{G-A\alpha}$; $f_{G-B\beta}$ with a frequency corresponding to the frequency control signal $c_{C-A}$; $f_{C-B}$ and a phase angle $\alpha$; $\beta$ corresponding to the phase control signal $c_{M-A}$; $c_{M-B}$. The generated frequency signal $f_{G-A\alpha}$, $f_{G-B\beta}$ is supplied to a multiplier 52 in which the magnitude of the generated frequency signal $f_{G-A\alpha}$; $f_{G-B\beta}$ is adjusted in accordance with the provided magnitude control signal $c_{M-A}$; $c_{M-B}$ for providing the digital compensation signal $d_{COMP-A}$, $d_{COMP-B}$.

The digital compensation signals $d_{COMP-A}$, $d_{COMP-B}$. are combined in an adder 53, which for example also combines correction signals $d_{CORR}$ as described herein. At the output of the adder 53 the combined digital compensation signal $d_{COMP}$ is provided, which is converted in the subsequent digital-to-analogue converter 54 to the analogue compensation signal $a_{COMP}$. The analogue compensation signal $a_{COMP}$ is applied to the balanced coil system 2 or to a receiver signal s2, s3 at the input of the receiver unit 3 or within the signal path of the receiver unit 3 as described with reference to FIG. 1 or FIG. 2.

Figure 4:
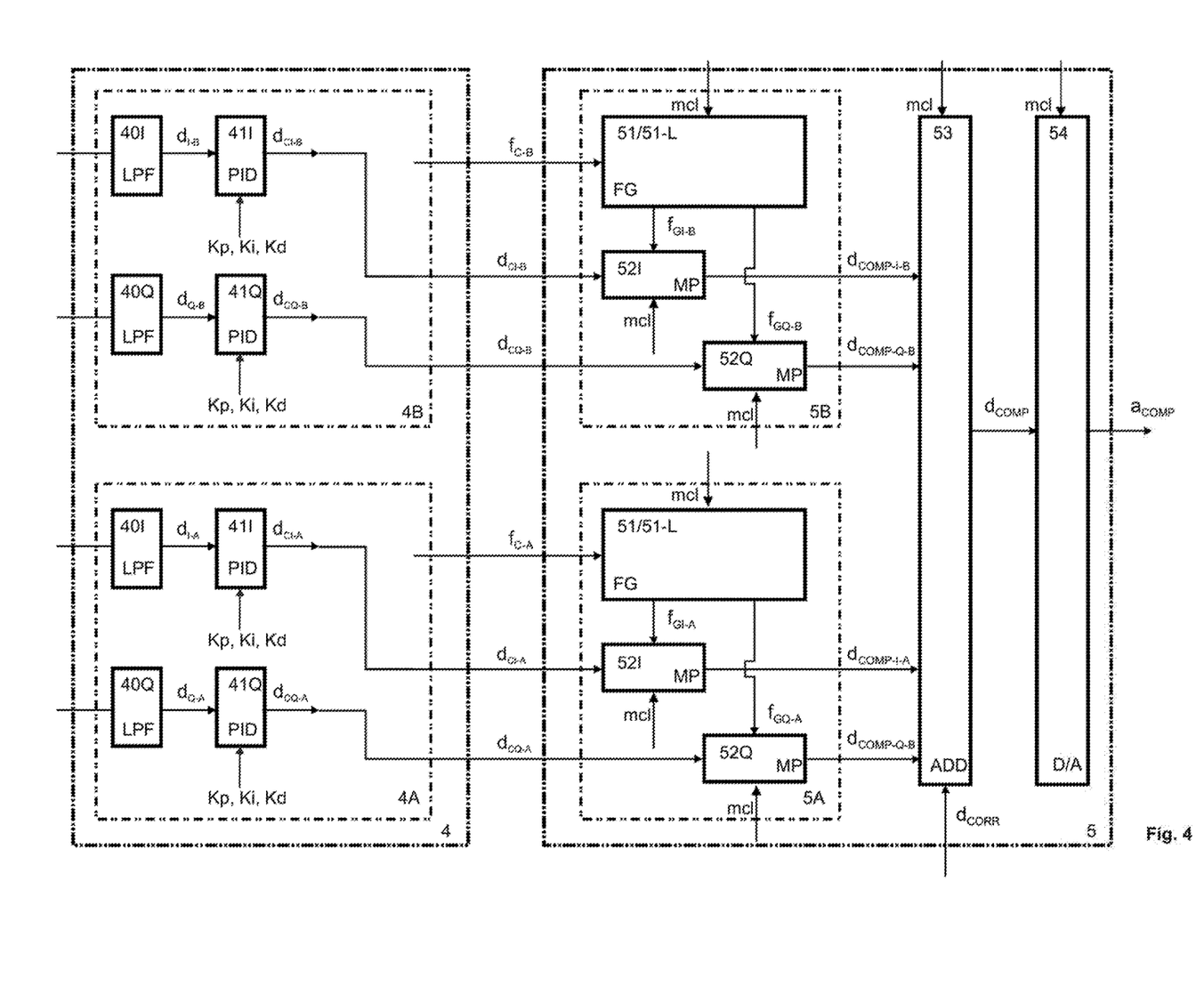
FIG. 4 shows an exemplary signal controller 4 and compensation unit 5 provided for two control channels in another exemplary embodiment.

FIG. 4 shows the signal controller 4 and the compensation unit 5 in another exemplary embodiment. Each control unit includes a signal controller 4A; 4B and a compensation unit 5A, 5B respectively. In each control channel, the in-phase control component $d_{CI-A}$; $d_{CI-B}$ and the quadrature control component $d_{CQ-A}$; $d_{CQ-B}$ are forwarded directly to the related compensation unit 5A, 5B. A frequency control signal $c_{C-A}$; $f_{C-B}$ is applied to the related frequency synthesizer 51/51L in the compensation unit 5A, 5B, which generates an in-phase frequency component $f_{GI-A}$; $f_{GI-B}$ and a quadrature frequency component $f_{GQ-A}$, $f_{GQ-B}$ corresponding to the frequency control signal $f_{C-A}$ or $f_{C-B}$.

In each control channel, the magnitude of the generated in-phase frequency component $f_{GI-A}$; $f_{GI-B}$ is adjusted in an in-phase multiplier 52I in accordance with the digital in-phase control component $d_{CI-A}$; $d_{CI-B}$ for providing a digital in-phase compensation component $d_{COMP-I-A}$; $d_{COMP-I-B}$. In a quadrature multiplier 52Q the magnitude of the quadrature frequency component $f_{GQ}$ is adjusted in accordance with the digital quadrature control component $d_{CQ-A}$; $d_{CQ-B}$ for providing a digital quadrature compensation component $d_{COMP-Q-A}$, $d_{COMP-Q-B}$. The digital in-phase compensation component $d_{COMP-I-A}$; $d_{COMP-I-B}$ and the digital quadrature compensation components $d_{COMP-Q-A}$, $d_{COMP-Q-B}$ are then combined in adder 53, which provides the combined digital compensation signal $d_{COMP}$, which is converted in the subsequent digital-to-analogue converter 54 to the analogue compensation signal $a_{COMP}$.

The at least one frequency signal $f_{GA}$, $f_{G-B}$ or in-phase frequency components $f_{GI}$ and quadrature frequency components $f_{GQ}$ thereof are generated by a direct digital synthesizing or by sequentially reading out data of the waveforms of the at least one frequency signal $f_{G-A}$, $f_{G-B}$ or in-phase frequency components $f_{GI}$ and quadrature frequency components $f_{GQ}$ thereof from a memory unit or look-up table 51L. U.S. Pat. No. 5,892,692 A, the disclosure of which is incorporated herein by reference in its entirety, describes a digital waveform oscillator that generates digitized waveforms without distortion using a lookup table.

US 2007/067123A1, the disclosure of which is incorporated herein by reference in its entirety, discloses an arbitrary waveform generator, which can be used for generating any desired waveform in the compensation unit. The control channels can individually use a waveform generator or can share a waveform generator. An arbitrary waveform generator can produce arbitrary signal waveforms that may be specific to their applications. These arbitrary signal waveforms can be utilized to simulate "real world" signals that include glitches, drift, noise and other anomalies on an arbitrary signal waveform that a component, such as a device under test, will encounter when it leaves the laboratory or manufacturing floor.

In exemplary embodiments, the disclosed method uses such a waveform generator to produce compensation signals $d_{COMP}$ or correction signals $d_{CORR}$ as described above. For example, a waveform generator or an arbitrary waveform generator in a comparably simple embodiment will be sufficient to compensate imbalance signals or disturbance signals, which recursively occur in a metal detector. Since signal waveforms are defined point-by-point, the resolution of the output signal can be increased by using more update points, which define the generated signal waveform.

In FIG. 3 and FIG. 4, exemplary embodiments have been described for two control channels or for two operating frequencies $f_{TX-A}$, $f_{TX-B}$ respectively. However, in exemplary metal detectors operating according to the presently disclosed method any number of control channels can be implemented.

Figure 5:
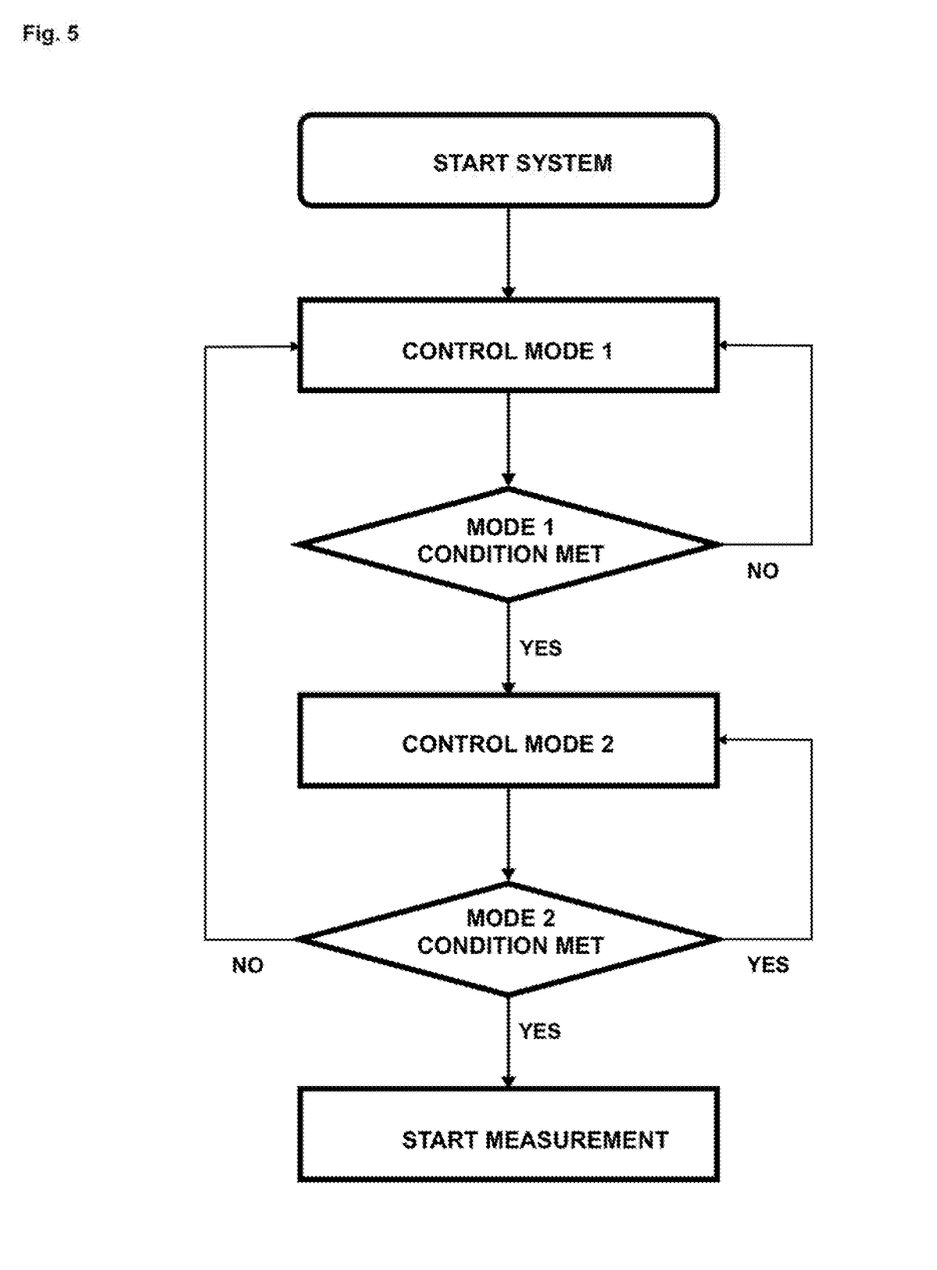
FIG. 5 shows an exemplary flow diagram with different operating modes in which compensation signals aCOMP are generated.

The signal controller 4, 4A; 4B is for example, operated in two or more modes, in which different sets of control terms are applied to the control units. FIG. 5 shows a flow diagram with different operating modes, in which compensation signals $a_{COMP}$ are generated.

According to the flow diagram the following exemplary steps are performed
- the metal detector is initialized (SYSTEM START)
- then the metal detector is set to a first control mode (CONTROL MODE 1);
- in CONTROL MODE 1 a first set of control terms Kp, Ki, Kd is applied to the first control unit 41I and to the second control unit 41Q, which control terms Kp, Ki, Kd are selected in such a way that the digital in-phase control components $d_{CI}$ and the digital quadrature control components $d_{CQ}$ are provided with a first correction factor;
- CONTROL MODE 1 is maintained for a defined period of time or as long as the imbalance signal exceeds a given threshold;
- in the event that the defined period of time has lapsed or the imbalance signal has fallen below the given threshold a second control mode (CONTROL MODE 2) is entered and the metal detector is changed to a state, in which measurement processes can be executed;
- in CONTROL MODE 2 a second set of control terms Kp, Ki, Kd is applied to the first control unit 41I and to the second control unit 41Q, which control terms Kp, Ki, Kd are selected in such a way that the digital in-phase control components $d_{CI}$ and the digital quadrature control components $d_{CQ}$ are provided with a second correction factor that is lower than the first correction factor and that leads to reduced corrections; and
- CONTROL MODE 2 is maintained as long as the imbalance signal does not exceed the given threshold.

CONTROL MODE 1 is maintained for example for period of time, in which the imbalance signal is for example reduced to a level, at which the imbalance signal has no significant influence on the measurement. Alternatively, the level, at which the imbalance signal has no significant influence on the measurement, is predetermined and compared with the actual imbalance signal. As soon as the imbalance signal is reduced below the corresponding threshold, CONTROL MODE 1 is changed to CONTROL MODE 2, in which measurement of products is performed while the imbalance signal is still observed and reduced in the control loop. In CONTROL MODE 1 the imbalance signal is quickly reduced, while in CONTROL MODE 2 a remaining imbalance signal is slowly driven to a minimum value. The control terms Kp, Ki, Kd for the second control mode are selected such that signal corrections in the control loop do not lead to disturbances during measurement of the products. For example, control terms Kp, Ki, Kd for the control units are selected such that overshoots are avoided. In the second control mode operating conditions are therefore continuously optimized, while measurement can be performed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS LIST 1 transmitter unit
10 frequency generator in the transmitter unit 1
2 coil system
21 drive coil
22, 23 detection coils
24 compensation coil
3 receiver unit
31 balanced transformer
32 input stage with amplifiers and/or filters
33 subtraction unit
34I, 34Q phase detectors
35I, 35Q filter units
36I, 36Q gain units; controllable gain units
37I, 37Q analogue to digital converters
38 phase shifter
4; 4A, 4B signal controller; signal controllers
40I, 40Q low pass filter
41I, 41Q control units
42 converter (CORDIC)
5; 5A, 5B compensation unit; compensation units
51, 51L frequency synthesizer, look up table
52; 52I, 52Q Multiplier
53 adder
54 A/D converter
6 Amplifier
60 single-ended-to-differential converter
9 control unit preferably comprising
   the signal controller 4
   the compensation unit 5
   a digital signal processor for processing signals relating to products contaminants and/or imbalances
$a_I$, $a_Q$ analogue in-phase and quadrature signals
$a_{COMP}$ analogue compensation signal
$c_M$ magnitude control signal
$c_{PH}$ phase control signal
$d_I$, $d_Q$ digital in-phase and quadrature signals
$d_{CI}$, $d_{CQ}$ digital in-phase and quadrature control signals
$d_{COMP}$ digital compensation signal
$d_{CORR}$ digital correction signal
$f_C$ frequency control signal $f_G$ generated frequency signal
$f_{TX}$; $f_{TX-A}$, $f_{TX-B}$ operating frequencies
Kp, Ki, Kd control terms
mc1 master clock
s1 transmitter signal
s2 input signal at the receiver unit 3
s3 signal in the receiver path
$s_{RI}$, $s_{RQ}$ reference signals

The invention claimed is:

1. A method for operating a metal detector having a balanced coil system with a drive coil that is connected to a transmitter unit which provides a transmitter signal (s1) with at least one operating frequency ($f_{TX}$), and with a first detection coil and a second detection coil that provide an output signal (s2) to a receiver unit that processes a related receiver signal (s3) which includes an imbalance signal, and that provides digital in-phase and quadrature components ($d_I$, $d_Q$) of a demodulated imbalance signal, the method comprising:
processing the digital in-phase and quadrature components ($d_I$, $d_Q$) of the imbalance signal in a signal controller for providing control data to a compensation unit that is configured for compensating the imbalance signal,
applying the digital in-phase components ($d_I$) of the imbalance signal to a first control unit (41I) which provides an in-phase control component ($d_{CI}$) for the imbalance signal, and applying the digital quadrature components ($d_Q$) of the imbalance signal to a second control unit (41Q) which provides a quadrature control component ($d_{CQ}$) for the imbalance signal;
synthesizing, in the compensation unit, a digital compensation signal ($d_{COMP}$) with a frequency of the imbalance signal which corresponds to the at least one operating frequency ($f_{TX}$), with a phase and magnitude according to the in-phase and quadrature control components ($d_{CI}$, $d_{CQ}$) provided for the imbalance signal;
converting the digital compensation signal ($d_{COMP}$) into an analogue compensation signal ($a_{COMP}$); and
applying the analogue compensation signal ($a_{COMP}$) to the balanced coil system or to the receiver signal (s2, s3) for compensating the imbalance signal.

2. The method for operating a metal detector according to claim 1, comprising:
generating an analogue compensation signal ($a_{COMP}$) for a plurality of imbalance signals relating to different operating frequencies ($f_{TX-A}$, $f_{TX-B}$).

3. The method for operating a metal detector according to claim 1, comprising at least one of:
using at least one low pass filter (40I; 40Q) for separating the imbalance signal in the signal path of the receiver unit or in the signal controller from other signals; or
applying the digital in-phase component ($d_I$) of the imbalance signal via a first low-pass filter (40I) to the first control unit (41I) and applying the digital quadrature component ($d_{CQ}$) of the imbalance signal via a second low-pass filter (40Q) to the second control unit (41Q).

4. The method for operating a metal detector according to claim 1, comprising:
using control terms (Kp, Ki, Kd) in the first control unit (41I) and the second control unit (41Q), which control terms (Kp, Ki, Kd) have proportional, integral and derivative influence on the provided digital in-phase control components ($d_{CI}$) and the digital quadrature control components ($d_{CQ}$).

5. The method for operating a metal detector according to claim 1, comprising:
in the signal controller, determining a digital in-phase component and a digital quadrature component and a frequency of a disturbance signal;
based on the digital in-phase component and the digital quadrature component of the disturbance signal, determining or calculating a digital in-phase control component and a digital quadrature control component for the disturbance signal;
in the compensation unit synthesizing a digital correction signal ($d_{CORR}$) in accordance with the digital in-phase component and a digital quadrature component of the disturbance signal and frequency information relating to the frequency of the disturbance signal; and
adding the digital correction signal ($d_{CORR}$) to the digital compensation signal ($d_{COMP}$).

6. The method for operating a metal detector according to claim 1, comprising:
converting the digital in-phase control component ($d_{CI}$) and the digital quadrature control component ($d_{CQ}$) into a phase control signal ($c_{PH}$) and into a magnitude control signal ($c_M$);
providing the phase control signal ($c_{PH}$) and the magnitude control signal ($c_M$) and a frequency control signal ($f_C$) to a synthesizer provided in the compensation unit;
controlling the synthesizer to generate a frequency signal ($f_G$) with a frequency in accordance with the frequency control signal ($f_C$) and with a phase in accordance with the phase control signal ($c_{PH}$); and
in a multiplier adjusting the magnitude of the generated frequency signal ($f_G$) in accordance with the provided magnitude control signal ($c_M$) for providing the digital compensation signal ($d_{COMP}$).

7. The method for operating a metal detector according to claim 1, comprising:
providing the digital in-phase control component ($d_{CI}$) and the digital quadrature control component ($d_{CQ}$) and a frequency control signal ($f_C$) to the compensation unit;
controlling a synthesizer to generate an in-phase frequency component ($f_{GI}$) and a quadrature frequency component ($f_{GQ}$) corresponding to the frequency control signal ($f_C$);
in a in-phase multiplier (52I) adjusting a magnitude of the generated in-phase frequency component ($f_{GI}$) in accordance with the digital in-phase control component ($d_{CI}$) for providing a digital in-phase compensation component ($d_{COMP-I}$) of the digital compensation signal ($d_{COMP}$), and in a quadrature multiplier (52Q) adjusting a magnitude of the quadrature frequency component ($f_{GQ}$) in accordance with the digital quadrature control component ($d_{CQ}$) for providing a digital quadrature compensation component ($d_{COMP-Q}$) of the digital compensation signal ($d_{COMP}$); and
combining the digital in-phase compensation component ($d_{COMP-I}$) of the digital compensation signal ($d_{COMP-I}$) and the digital quadrature compensation component ($d_{COMP-Q}$) of the digital compensation signal ($d_{COMP}$) for providing the digital compensation signal ($d_{COMP}$).

8. The method for operating a metal detector according to claim 1, comprising:
combining digital compensation signals ($d_{COMP-A}$, $d_{COMP-B}$), which have been synthesized for each related imbalance signal, for providing a combined digital compensation signal ($d_{COMP}$); and converting the combined digital compensation signal ($d_{COMP}$) to the analogue compensation signal ($a_{COMP}$).

9. The method for operating a metal detector according to claim 7, comprising:
generating the at least one frequency signal ($f_{G-A}$, $f_{G-B}$) or in-phase frequency components ($f_{GI}$) and quadrature frequency components ($f_{GQ}$) thereof by a direct digital synthesizing or by sequentially reading out data of waveforms of the at least one frequency signal ($f_{G-A}$, $f_{G-B}$) or in-phase frequency components ($f_{GI}$) and quadrature frequency components ($f_{GQ}$) thereof from a memory unit or look-up table (51L) or an arbitrary waveform generator.

10. The method for operating a metal detector according to claim 7, comprising:
synchronizing the at least one generated frequency signal ($f_{G-A}$, $f_{TXG-B}$) or in-phase frequency components ($f_{GI}$) and quadrature frequency components ($f_{GQ}$) thereof generated in the compensation unit with regard to phase and frequency with the corresponding operating frequencies ($f_{TX-A}$, $f_{TX-B}$) generated in the transmitter unit.

11. The method for operating a metal detector according to claim 1, comprising:
applying the analogue compensation signal ($a_{COMP}$) to a compensation coil of the balanced coil system; or
applying the analogue compensation signal ($a_{COMP}$) to the input signal (s2) of the receiver unit; or
applying the analogue compensation signal ($a_{COMP}$) via a summation module or subtraction module, to the receiver signal (s3) in a signal path of the receiver unit.

12. The method for operating a metal detector according to claim 1, comprising:
initializing that metal detector;
setting the metal detector to a first control mode, in which no products are measured;
in the first control mode applying a first set of control terms (Kp, Ki, Kd) to the first control unit (41I) and to the second control unit (41Q), which control terms (Kp, Ki, Kd) are selected in such a way that the digital in-phase control components ($d_{CI}$) and the digital quadrature control components ($d_{CQ}$) are provided with a first correction factor; and at least one of:
maintaining the first control mode for a defined period of time or as long as the imbalance signal exceeds a given threshold, and entering an operation mode, in which products are measured, after the defined period of time has lapsed or the imbalance signal has fallen below the given threshold; or
maintaining the first control mode for a defined period of time or as long as the imbalance signal exceeds a given threshold, and entering a second control mode, in which products are measured and the imbalance signal is further observed and reused, after the defined period of time has lapsed or the imbalance signal has fallen below the given threshold.

13. The method for operating a metal detector according to claim 12, comprising:
applying the in-phase control component ($d_{CI}$) and the quadrature control component ($d_{CQ}$) or the digital compensation signal ($d_{COMP}$) or the analogue compensation signal ($a_{COMP}$) determined and optionally stored in the first control mode.

14. The method for operating a metal detector according to claim 12, comprising:
in the second control mode, applying a second set of control terms (Kp, Ki, Kd) to the first control unit (41I) and to the second control unit (41Q), which control terms (Kp, Ki, Kd) are selected in such a way that the digital in-phase control components ($d_{CI}$) and the digital quadrature control components ($d_{CQ}$) are provided with a second correction factor that is lower than the first correction factor and leads to reduced corrections.

15. The method for operating a metal detector according to claim 12, comprising:
monitoring the imbalance signal and returning to the first control mode if the imbalance signal exceeds a predetermined threshold.

16. A metal detector comprising:
a balanced coil system with a drive coil that is connected to a transmitter unit configured to provide a transmitter signal (s1) with at least one operating frequency ($f_{TX}$);
a first detection coil and a second detection coil configured to provide an output signal (s2);
a receiver unit configured to receive the output signal and to process a receiver signal (s3) which includes an imbalance signal, and to provide digital in-phase and quadrature components ($d_I$, $d_Q$) of a demodulated imbalance signal; and
a signal controller configured to receive the demodulated imbalance signal to provide control data to a compensation unit which is configured for compensating the imbalance signal, wherein
a) a first control unit configured to receive the digital in-phase components ($d_I$) of the imbalance signal and to provide an in-phase control component ($d_{CI}$) for the imbalance signal, and a second control unit configured to receive the digital quadrature components ($d_Q$) of the imbalance signal and to provide a quadrature control component ($d_{CQ}$) for the imbalance signal;
b) the compensation unit being configured to:
synthesize a digital compensation signal ($d_{COMP}$) with a frequency of the imbalance signal which corresponds to the at least one operating frequency ($f_{TX}$), with a phase and magnitude according to the in-phase and quadrature control components ($d_{CI}$, $d_{CQ}$) provided for the imbalance signal;
convert the digital compensation signal ($d_{COMP}$) into an analogue compensation signal ($a_{COMP}$); and
apply the analogue compensation signal ($a_{COMP}$) to a compensation coil of the balanced coil system, or to the input signal (s2) of the receiver unit, or via a summation module or subtraction module to the receiver signal (s3) in a signal path of the receiver unit for compensating the imbalance signal.

17. The metal detector according to claim 16, wherein the signal controller and the compensation unit comprise:
a plurality of control channels configured for generating digital compensation signals ($d_{COMP}$) for imbalance signal occurring with different operating frequencies ($f_{TX-A}$, $f_{TX-B}$).

18. The method for operating a metal detector according to claim 2, comprising at least one of:
using at least one low pass filter (40I; 40Q) for separating the imbalance signal in the signal path of the receiver unit or in the signal controller from other signals; or
applying the digital in-phase component ($d_I$) of the imbalance signal via a first low-pass filter (40I) to the first control unit (41I) and applying the digital quadrature component ($d_{CQ}$) of the imbalance signal via a second low-pass filter (40Q) to the second control unit (41Q).

19. The method for operating a metal detector according to claim 18, comprising:
using control terms (Kp, Ki, Kd) in the first control unit (41I) and the second control unit (41Q), which control terms (Kp, Ki, Kd) have proportional, integral and derivative influence on the provided digital in-phase control components ($d_{CI}$) and the digital quadrature control components ($d_{CQ}$).

20. The method for operating a metal detector according to claim 19, comprising:
   in the signal controller, determining a digital in-phase component and a digital quadrature component and a frequency of a disturbance signal;
   based on the digital in-phase component and the digital quadrature component of the disturbance signal, determining or calculating a digital in-phase control component and a digital quadrature control component for the disturbance signal;
   in the compensation unit synthesizing a digital correction signal ($d_{CORR}$) in accordance with the digital in-phase component and a digital quadrature component of the disturbance signal and frequency information relating to the frequency of the disturbance signal; and
   adding the digital correction signal ($d_{CORR}$) to the digital compensation signal ($d_{COMP}$).

* * * * *

UNITED STATES PATENT AND TRADEMARK OFFICE
CERTIFICATE OF CORRECTION

PATENT NO. : 10,895,658 B2
APPLICATION NO. : 16/850166
DATED : January 19, 2021
INVENTOR(S) : Yifei Zhao It is certified that error appears in the above-identified patent and that said Letters Patent is hereby corrected as shown below:

In the Specification

Column 14, Line 3, change "$c_{C-A}$; $f_{C-B}$" to -- $f_{C-A}$; $f_{C-B}$ --.

Column 14, Line 7, change "$c_{C-A}$; $f_{C-B}$" to -- $f_{C-A}$; $f_{C-B}$ --.

Column 14, Line 9, change "$f_{G-A\alpha}$, $f_{G-B\beta}$" to -- $f_{G-A\alpha}$; $f_{G-B\beta}$ --.

Column 14, Line 14, change "$d_{COMP-A}$, $d_{COMP-B}$." to -- $d_{COMP-A}$, $d_{COMP-B}$ --.

Column 14, Line 32, change "$c_{C-A}$; $f_{C-B}$" to -- $f_{C-A}$; $f_{C-B}$ --.

Column 14, Line 35, change "$f_{GQ-A}$, $f_{GQ-B}$" to -- $f_{GQ-A}$; $f_{GQ-B}$ --.

Column 14, Line 46, change "$d_{COMP-Q-A}$, $d_{COMP-Q-B}$" to -- $d_{COMP-Q-A}$; $d_{COMP-Q-B}$ --.

Column 14, Line 48, change "$d_{COMP-Q-A}$, $d_{COMP-Q-B}$" to -- $d_{COMP-Q-A}$; $d_{COMP-Q-B}$ --.

Column 14, Line 53, change "$f_{GA}$, $f_{G-B}$" to -- $f_{G-A}$, $f_{G-B}$ --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*